United States Patent [19]

Rembaum et al.

[11] 4,102,827
[45] Jul. 25, 1978

[54] NOVEL POLYELECTROLYTES

[75] Inventors: Alan Rembaum; Shiao-Ping Siao Yen, both of Altadena, Calif.

[73] Assignee: California Institute of Technology, Pasadena, Calif.

[21] Appl. No.: 650,910

[22] Filed: Jan. 21, 1976

Related U.S. Application Data

[62] Division of Ser. No. 427,917, Dec. 26, 1973, Pat. No. 4,036,808, which is a division of Ser. No. 280,649, Aug. 14, 1972, Pat. No. 3,898,188.

[51] Int. Cl.$^2$ ............................................. C08G 73/00
[52] U.S. Cl. ..................................... 260/823; 210/54; 260/874; 260/895; 260/901; 424/78; 252/8.6; 252/61; 528/422
[58] Field of Search ............... 260/823, 895, 901, 2 R, 260/874

[56] References Cited

U.S. PATENT DOCUMENTS

| 3,629,161 | 12/1971 | Paine et al. | 260/823 |
| 3,778,476 | 12/1973 | Rembaum et al. | 260/2 R |
| 3,784,649 | 1/1974 | Buckman et al. | 260/874 |
| 3,898,188 | 8/1975 | Rembaum et al. | 260/2 R |
| 3,927,242 | 12/1975 | Rembaum et al. | 260/874 |

OTHER PUBLICATIONS

Gibbs, C.F. et al., "Quaternary Ammonium Salts from Halogenated Alkyl Dimethylamines II, the Polymerization of Gamma-Halogenopropyldimethylamines, J. of the American Chem. Soc., vol. 55, p. 753 (1933).

Primary Examiner—Harold D. Anderson
Assistant Examiner—E. A. Nielsen
Attorney, Agent, or Firm—Marvin E. Jacobs

[57] ABSTRACT

Cationic polyelectrolytes are formed by the polymerization in absence of oxygen of a monomer of the general formula:

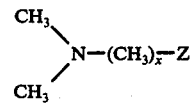

where $x$ is 3 or more than 6 and Z is I, Br or Cl to form high charge density linear polymers. Segments of the linear polymer may be attached to or formed in the presence of polyfunctional reactive tertiary amines or halogen polymeric substrates or polyfunctional lower molecular reactive polyfunctional substrates to form branched or star polyelectrolytes by a quaternization polymerization reaction.

8 Claims, No Drawings

NOVEL POLYELECTROLYTES

ORIGIN OF THE INVENTION

The invention described herein was made in the performance of work under a NASA contract and is subject to the provisions of Section 305 of the National Aeronautics and Space Act of 1958, Public Law 83-568 (72 Stat. 435; 42 USC 2457).

CROSS REFERENCE TO RELATED APPLICATIONS

This application is a division of Ser. No. 427,917, filed Dec. 26, 1973, now U.S. Pat. No. 4,036,808, which in turn is a division of Ser. No. 280,649, filed Aug. 14, 1972, now issued as U.S. Pat. No. 3,898,188.

BACKGROUND OF THE INVENTION

1. Field of the Invention

This invention relates to novel polyelectrolytes. More particularly, the invention relates to polyelectrolytes having a high concentration of cationic nitrogen centers.

2. Description of the Prior Art

Poly-quaternary ammonium polymeric polyelectrolytes have generally been produced by the copolymerization of a dihalide and a ditertiary amine. The more desirable short chain monomers should produce the highest charge density polymers. However, many of the $C_1$ to $C_6$ combinations of monomers produce cyclic rather than linear polymeric products.

Polyammonium salts can also be formed by the homopolymerization of AB monomers such as haloalkyl tertiary amines. In German Pat. No. 1,126,396 which disclosed the synthesis of an AB monomer of this type, it was noted that the AB compound was unstable and when dimethylaminoethylchloride was heated to between 80° C and 100° C in water, a viscous material was recovered identified as a polyammonium salt. However, it is now known that this compound forms a cyclic 6 member ring.

Gibbs et al, (JACS 55, 753, 1933) polymerized dimethylaminopropylchloride (DMAP Cl) or BR DMAP Br in bulk on a steam bath. This procedure is only capable of forming low molecular weight products. The molecular weights were determined from the ratio of nonionic to ionic halogen in the product. This method of determining molecular weight is now considered inaccurate and would provide higher values than the analytical method utilized in the present invention.

High molecular weight polycationic materials having high charge density will find many uses such as flocculants in the clarification of residential and industrial water supplies, and effluents, as dewatering agents, as flotation agents, as catalyst and pigment retention additives, and as gelling agents. Polyelectrolyte materials will also find use in the rheological modification of fluids such as friction reducers, as dispersants for clay and sludge in both aqueous and oil based systems as well as antistatic agents, and additives to cosmetics, textile finishes and lubricating oils. These materials generally exhibit germicidal action and are effective bactericidal and fungicidal agents. A further important area of application is in the preparation of electroconductive photocopy papers.

All of these applications are dependent on the quaternary ammonium function and the availability and density of the groups. The activity in all cases will be enhanced by improving either or both of these characteristics.

SUMMARY OF THE INVENTION

High charge density polymers having a molecular weight above 5000 are produced in accordance with this invention by polymerization under oxygen excluding conditions of a monomer of the formula:

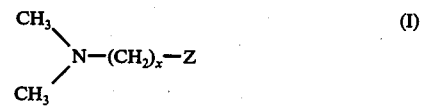

where $x$ is 3 or more than 6 and Z is I, Cl, or Br.

At values of $x$ other than 3 or 7 - 10 cyclic compounds are formed and linear homopolymerization does not occur. Monomers such as dimethylaminoethylchloride or cycloalkyl, benzyl or phenyl substituted amino alkyl halides as taught in German Pat. No. 1,126,396 do not form homopolymers.

Furthermore, if the monomer of formula I is characterized as an AB monomer where A is $(CH_3)_2N-$ and B is Z then the homopolymer will have the formula:

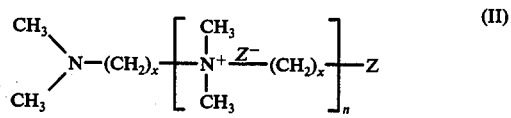

where $n$ is an integer of at least 200 and the molecular weight is preferably at least 30,000.

Thus the polymer is always terminated by A and B functional groups. In contrast polyquaternary polymers prepared from A—A, B—B monomer mixtures would form an unresolved mixture of A—A, B—B, and A-B terminated polymers.

Furthermore, in the A—A, B—B polymerization the stoichiometry must be exactly balanced or chain termination occurs. Highly polar solvents must be utilized and the high charge density present with monomers such as $A(CH_2)_3A$ and $B(CH_2)_3B$ also interferes with the production of high molecular weight, linear chains. Furthermore, the mixed functionality of the terminated mixtures prevents formation of star and branched polymers in accordance with the invention.

The branch polymers have a comb-like structure and are formed by attaching a plurality of units of the homopolymer of the invention to a polymeric substrate containing a plurality of functional groups reactive with either $(CH_3)_2N-$ or $Z-$ of the AB monomer. The polymeric substrate may be selected from polymers having a repeating structure of the formulae:

where $R^1$ is the residue of the polymerization reaction forming the backbone of the polymer and may be aliphatic, aromatic, typically containing from 2 to 30 carbon atoms depending on the spacing desired for the branches. $R^1$ can be hydrocarbon such as alkylene or heterocarbon such as polyether, polyester, polyurethane, excluding groups that react with A or B as defined above.

$R^2$ can be hydrogen, lower alkyl or aryl such as phenyl. $R^3$ is a short chain linking group such as lower alkylene, phenylene, alkyl ester and the like. D is a functional group reactive with either A or B such as tertiary nitrogen, $(R^4)_2N$ or Z where $R^4$ is an organic group such as lower alkyl, aryl, aralkyl and $n$ is an integer. In the case of Z, $R^3$ should not be phenyl since the halogen is not sufficiently reactive with the tertiary amine groups of the AB monomer.

Suitable polymeric substrates are polymers such as poly-4-vinyl pyridine, polyethylene imine, polyvinylbenzylchloride, polyepichlorohydrin, polydimethylaminomethyl ethylene oxide, poly-dialkylaminoalkylacrylates such as poly-dimethylaminoethyl acrylate, polydialkylaminoalkylacrylamide such as polydimethylaminopropyl acrylamide and the like. The polymer may be syndiotactic, isotactic, or atactic.

Star polymers having a molecular weight of at least 5,000 are formed by attaching radial sections of the homopolymer of this invention to a central monomer of the formula:

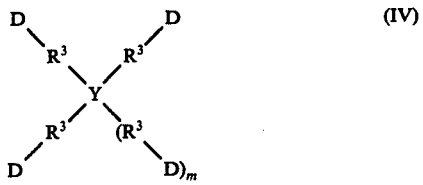

(IV)

where Y is a central, polyvalent, comparatively low molecular weight organic group having a valence of $3+m$, $m$ is an integer from 0 to 3, $R^3$ and D are as defined above. Y can be an aromatic compound such as benzene or lower alkylated benzene. Suitable central monomeric compounds being 2,4,6-tri-(chloromethyl)-mesitylene, 1,2,4-tri-(chloromethyl)-benzene and 1,2,4,5-tetra-(chloromethyl)-benzene. The two benzene compounds are prepared from p-xylene in accordance with the procedure disclosed by M. Kulka, Canadian Journal of Research 23, 106 (1945). The central monomer can also be a polytertiary amine compound such as compounds of the formula:

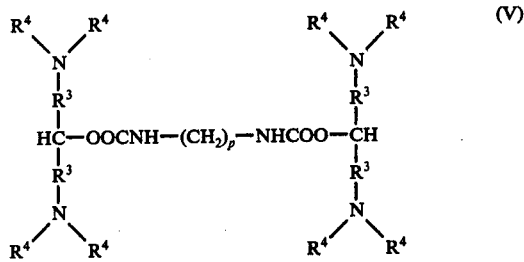

(V)

where $p$ is an integer from 2 to 10 and $R^4$ and $R^3$ are as defined above.

The polymerization reaction in each case involves head-to-tail quaternization reaction of the A-B monomer to form linear chains. In order to obtain polymers having a molecular weight above 5,000 and preferably from 30,000 to at least 60,000 the reaction must be conducted under oxygen excluding conditions, suitably by deaerating or degassing the reaction mixture before polymerization and by blanketing the reaction mixture with an inert gas, such as nitrogen or vacuum during polymerization. Preliminary deaeration can be effected by bubbling nitrogen through the reaction mixture for a minimum period or by applying vacuum to the mixture for a sufficient period before application of heat. It has been found that carbon dioxide inhibits the quaternization reaction and oxygen causes the formation of water-insoluble products.

It is also desirable that the AB monomer be present in the reaction mixture in a relatively high concentration. The rate of reaction and the molecular weight are dependent on monomer concentration and temperature. The monomer concentration is preferably maintained at no less than 2 molar and preferably 3–8 molar and the reaction temperature is controlled within 40° C to 125° C, preferably 90° C to 110° C. Completion of polymerization can be determined by monitoring disappearance or consumption of monomer.

A preferred AB monomer from the viewpoint of availability, cost, reactivity and high charge density is 1,3-dimethylaminopropylchloride. This material is normally furnished commercially as a solid hydrochloride of the formula:

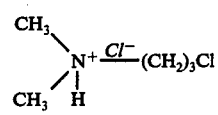

The solid hydrochloride is initially treated with a base such as sodium hydroxide to convert it to a liquid form. The resulting liquid is insoluble in water. In a first procedure the water-insoluble, liquid monomer is converted to a water soluble prepolymer having the structure of formula II by heating the insoluble monomer in alcohol, preferably at reflux and evaporating to dryness to form a low molecular weight prepolymer solid which is soluble in water. This polymer can be dissolved in water and further polymerized to a solid product having a molecular weight above 30,000 and an intrinsic viscosity in 0.40M aqueous KBr of above 0.15 dl/g, typically 0.24 dl/g.

In an alternative procedure, the insoluble monomer can be dispersed in water by means of 0.001 to 30% by weight of a nonionic surfactant, suitably difunctional block-polymers terminating in primary alcohol groups with molecular weights ranging from 1,000 to over 15,000 such as a polyoxyalkylene derivative of propylene glycol or polyvinyl alcohol. Suitable materials are Pluronic F.68, P.85, or 6.62 (Wyandotte Chemicals Corp.).

The branch or star polymers can be formed by indirect or direct polymerization procedures. In a first procedure a stoichiometric amount of AB monomer can be added based on the amount of D to form an adduct of AB with each D group. Homopolymerization can then proceed forming radial AB polymeric chains from each functional site.

In another procedure the AB monomer is added to the branch polymer substrate or star nucleus and copolymerized directly to form the high charge density product radiating polyquaternary sections. In a further procedure, the AB monomer is prepolymerized and the homopolymer is attached to the D sites or the D-AB adduct sites of the branch or star nucleus.

In the case of substrate branch polymers or central star monomers having residual reactivity, it is possible to form a water soluble comb-polymer or star polymer intermediate which can be coated onto a substrate or impregnated into a carrier and then immobilized by heating the product to render the polymer water insoluble. For example, polyvinylbenzylchloride comb polymer forms an insolubilized structure when heated. Apparently there are unreacted chloromethyl groups present which react with benzene rings on other polymer chains to form cross-links by an alkylation mechanism. This will be very useful in manufacturing photocopy papers in which the paper can be impregnated from aqueous solution and then heated to convert the polyelectrolyte to a water insoluble form.

The polyelectrolytes of this invention are in each case terminated with a reactive Z— or $(CH_3)_2N$— group. The water soluble polymeric intermediates can be further reacted with polyfunctional compounds of the formula:

where D is defined above, $R^5$ is an organic group, and $m$ is a number from 0 to 2, to form cross-linked or gelled, water insoluble products.

In the case of a homopolymer, D can be either tertiary amine or chloro, bromo or iodo. In the case of a star or branch polymer, D is selected to be reactive with the end group of the chain. Thus, a chloro substituted central star monomer or polymer will form chloro terminated chains. Therefore, a diamine would be selected for cross-linking.

Exemplary polyamines are selected from compounds of the formula:

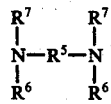

where $R^6$ and $R^7$ are hydrocarbon radicals such as alkyl, aryl or alkenyl preferably containing 1 to 10 carbon atoms or $R^6$ and $R^7$ may be joined into a single hydrocarbon radical. $R^5$ is a divalent organic radical containing at least 2 carbon atoms such as alkylene, arylene, cycloalkylene, alkenylene, aralkylene, polyoxyalkylene or polythioalkylene. $R^5$ may contain 3-100 carbon atoms and may be of prepolymer length.

Exemplary ditertiary aliphatic amines are N, N, N′, N′-tetramethylhexamethylene diamine or tetramethyldecamethylene diamine. Heterocyclic compounds can also be utilized in which case $R^6$ and $R^7$ may be combined. Examples of such ditertiary amino compounds are 1,2-bis-(4-pyridyl)-ethane or 1,2-bis-(4-pyridyl)-ethene. Other ditertiary nitrogen derivatives may be formed from heterocyclic compounds such as picoline, quinoline, acridine, phenanthridine, phenanthroline, or N-alkyl piperidine, pyrrolidone or pyrrole.

Dihalo cross-linking agents may be selected from those of the formula:

where $R^5$ is as defined above. Examples of specific compounds are 1,3-dibromopropane, 1,4-dibromobutane, 1,4-dibromobutene, 1,5-dibromopentane, 1-10-dibromodecane, 1,6-dichlorohexane and dibromodimethylbenzene.

The polyelectrolytes of the invention exhibit bacteriostatic as well as bacteriocidal activity when tested by standard clinical procedures against gram positive and gram negative bacteria cultures. The solubility of the high molecular weight polyelectrolytes, therefore, permits formation of a solution which can be topically applied to traumatic skin areas of the subject such as burns, abrasions or cuts.

Particularly useful compositions can be formed by the addition of a supplemental water soluble film former such as polyvinyl alcohol or polyvinyl pyrrolidone. The polyelectrolyte may impart elastomeric properties to the final film. The solution is applied to a wound and on evaporation of the water an elastic membrane film is cast. The film is readily removed by application of water. The solution is also very effectively applied to tissue as a spray to achieve a lasting adherent bacteriostatic film which will expand and contract with the movement of the tissue. This is very important in the need to exclude air and retain moisture when dressing burns. Furthermore, the film simultaneously exhibits antiseptic, astringent and coagulant activity. The solution can also be utilized to impregnate gauze materials to form an antiseptic, coagulant, germicidal dressing material.

The polyelectrolytes of this invention can also be dispersed in a water insoluble binder. The polyelectrolyte may be compounded and dispersed into a water insoluble binder such as a polyester, polyamide or vinyl resin or the binder may be formed in the presence of the polyelectrolyte. For example, the polyelectrolyte can be compounded with co-reactive, water soluble, polymers such as polyvinyl alcohol and polyacrylic acid. The solution may be cast and then heated to form ester cross-links between the OH groups of the polyvinyl alcohol and COOH groups of the polyacrylic acid. The final film is water swellable but water insoluble.

The polyelectrolytes of this invention may also be reacted with anionic polymers or salts thereof such as polystyrene sulfonates, polyacrylates and the like and particularly with heparin or its alkali or ammonium salts to form ionically-linked, polymeric salts.

The nature of the cross-links is due to an ionic bond between negative groups on the anionic polymer and the quaternary nitrogen on the polyelectrolyte. The polymeric salts which contain heparin would provide non-thrombogenic surfaces.

Films or membranes can be formed by casting a solution of the copolymer salt and evaporating the solvent. The surfaces of membranes, tubes, catheters, valves, prosthetic veins, etc., can be coated with solutions of the heparin, copolymer salt and the solvent removed, suitably by vacuum drying to deposit a non-thrombogenic coating. The copolymer salt is compatible with numerous substrates such as Tygon (polyvinyl) Teflon (polytetrafluoroethylene), Dacron (polyester), silicone resins, glass, polystyrene, and polyurethane.

The characteristics of the film or membrane depend on the particular polyelectrolyte and anionic polymer utilized. The membranes, films or molded articles may be utilized in water desalination, prosthetic body implants and battery separators.

Polymeric analogs of organic charge transfer complexes can be prepared which exhibit high electrical conductivity. For example, the cationic polyelectrolytes can be combined with 7,7,8,8-tetracyanoquinodimethane (TCNQ) to form salts having high conductivity. The mechanism of electronic transport or pseudometallic behavior of the polymeric salts is not well understood. The salts exhibit high electrical conductivities in the presence of lithium TCNQ. On addition of neutral TCNQ the resistivity of the product is dramatically lowered probably caused by increased electron delocalization. The polyelectrolytes and the salts with charge transfer complexes thereof will find use as totally organic conductive materials.

DESCRIPTION OF THE PREFERRED EMBODIMENTS

The following examples illustrate preparation of homopolymers from AB monomers.

EXAMPLE 1

12.1 grams of 1,3-dimethylaminopropylchloride (DMAP Cl) was added to 100 ml of absolute alcohol to form a one molar solution of the monomer. The solution was then refluxed under nitrogen for four hours. After refluxing, the alcohol solvent was removed by vacuum evaporation. Twelve grams of a prepolymer was obtained which had an intrinsic viscosity of about 0.03 in 0.4 M KBr. Six grams of the low molecular weight prepolymer obtained was then dissolved in 4 ml of water. The solution was heated for 4½ hours at 95° C under a nitrogen atmosphere. A solid reaction product was isolated which had an intrinsic viscosity of 0.21 and is a solid homopolymer having a molecular weight above 20,000.

EXAMPLE 2

26 g of DMAP Cl was reacted with mechanical stirring in 8 ml of $H_2O$ under $N_2$ at 100° C for four hours. Upon freeze drying and subsequent vacuum drying at 60° C for 24 hours, 18 g of water soluble polymer was obtained (69.2% yield) $[\eta] = 0.24$ in 0.4 M KBr.

EXAMPLE 3

Following the procedure of Example 2, 26 g of DMAP Cl was reacted with 8 ml $H_2O$ in air at 100° C for four hours. 16 gm of water soluble polymer was obtained (61.5%) $[\eta] = 0.146$ in 0.4 M KBr.

EXAMPLE 4

Following the procedure of Example 2, 26 gm of dimethylaminopropylchloride was reacted in 8 ml $H_2O$ under $O_2$ at 100° C for 4 hours. A small amount of white ppt was obtained. The white ppt was insoluble in $H_2O$ (about 1 gm of insoluble polymer ~3.9%). The yield of water soluble polymer was 65.4% (19 gm) $[\eta] = 0.098$.

EXAMPLE 5

The homopolymer prepared in accord with the procedure in Example 1 was tested as a flocculating agent by a technique described by D. Casson and A. Rembaum POLYMER LETTERS 8, 773 (1970). The optimum polymer dosage for the homopolymer of Example 1 for the flocculation of a clay suspension in accordance with the method described was 20 µg/l. This compares to a commercial polyelectrolyte, poly (2-methyl-5-vinylpyridiniumchloride) having an approximate molecular weight of $10^6$, which required a dosage of 60 µg/l when tested under identical conditions.

The homopolymers branch and star polymers of this invention can be utilized to form conductive hydrogels having unusually high conductivity. The hydrogels are prepared by reacting a polymer of this invention with a gel forming polymer such as polyvinyl alcohol, polyacrylic acid, alginic acids and polyethers. Cross-linked hydrogels can be prepared from aqueous solutions of a mixture of polyvinyl alcohol and polyacrylic acid or polyhydroxyethylmethacrylate. The hydrogels can be comprised of from 20 to 95 weight percent of the gel former with the remainder being the polyelectrolyte of this invention.

EXAMPLE 6

To a solution of 4 grams of polyvinyl alcohol in 200 cc of water was added a solution of 1 gram of homopolymer of Example 1 in 10 cc of water. The two solutions were stirred until a homogenous viscous material was obtained. The mixed solution after casting on a glass plate yielded an elastic film. At 20 percent humidity, the surface resistivity of the film was found to be $4.9 \times 10^5$ ohms/cm$^2$.

EXAMPLE 7

An insoluble cross-linked hydrogel was prepared from an aqueous solution containing 40 weight percent polyvinylalcohol, 40 weight percent polyacrylic acid, and 20 weight percent of the homopolymer of Example 1 in water. A film was cast from the solution. The cast film was then cross-linked by heating at 100° C for 10 minutes. The surface resistivity at 20 percent humidity of the cross-linked film was $2 \times 10^4$ ohms/cm$^2$.

In the preparation of a star polymer the polyamine or polyhalide is first dissolved in a highly polar solvent such as dimethylformamide (DMF) dimethyl-sulfoxide (DMSO), methanol and their mixtures with water. The AB monomer is then added to this solution in a substantial stoichiometric excess and heated to a temperature from 40° to 100° C. The star polymer is recovered by evaporating solvent. Specific examples follow:

EXAMPLE 8

An amine of formula V where p is 6 was synthesized by reacting 0.10 mole of hexamethylene-1, 6-diisocyanate added dropwise with stirring to 0.2 moles of 1,3-bis-(dimethylamino)-2-propanol in a flask cooled in an ice bath. Both the reactants were freshly distilled under vacuum before use. The reaction mixture was then allowed to warm gradually to room temperature and stirring continued for several hours. The viscous liquid was diluted with toluene and the product separated from the latter by ether extraction of the toluene. The structure of the amine was confirmed by means of NMR and IR spectra.

EXAMPLE 9

A tetrafunctional tertiary amine of the formula:

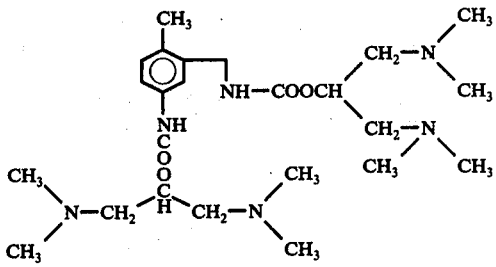

was synthesized by adding 0.1 mole of toluene-2,4-diisocyanate drop-wise with stirring to 0.2 mole of 1,3-bis-(dimethylamino)-2-propanol cooled in an ice bath. Both of these reactants were freshly distilled under vacuum before use. After allowing them to warm to room temperature, the reaction mixture solidified. The solid cake formed was broken up and washed thoroughly with benzene and then dried in a vacuum oven at 40° C. The structure of the tetrafunctional amine was confirmed by NMR and IR spectra.

EXAMPLE 10

Four solutions were prepared in 4:1 by volume DMF-H$_2$O containing (A) the compound of Example 8, (B) the compound of Example 9, (C) 2,4,6-tri-(chloromethyl)-mesitylene and (D) 1,2,4,5-tetra-(chloromethyl)-benzene. 50 cc portions of the solutions were added to DMAP Cl in the following proportions:

Table I

| Solution | Weight of Compound, grams | Weight of DMAP Cl, gram |
|----------|---------------------------|-------------------------|
| A | 0.044 | 12.6 |
| B | 0.034 | 12.6 |
| C | 0.050 | 12.6 |
| D | 0.060 | 12.6 |

The mixtures were heated at 54° C for seven days. A small amount of water was then added to dissolve some insoluble material formed during the reaction period. All the samples were rotary evaporated to dryness and thoroughly washed with acetone and dried in a vacuum oven at 40° C for four days. The yield of all samples after drying was 100 percent. The intrinsic viscosities of the materials determined in 0.4 M KBr aqueous solution were as follows:

Table II

| Sample | [$\eta$], 0.4 M KBr |
|--------|---------------------|
| A | 0.15 |
| B | 0.14 |
| C | 0.18 |
| D | 0.15 |

To confirm the presence of the star polymer, one gram of Sample D was dissolved in methanol. 0.05 grams of 1,4-dibromobutene was added and the mixture was heated at 60° C for ten minutes. A gel was formed which was insoluble in water as well as common organic solvents. The formation of the gel by cross-linking the tertiary amine terminated branches with the reactive bromo groups served as evidence of the presence of the branches on the Sample D material.

EXAMPLE 11

Of the star polyelectrolytes of Example 10, A-D were tested as flocculation agents for clay suspensions in accordance with the procedure of Example 5. The optimum dosage of the star polyelectrolytes was 20 μg/l as compared to 60 μg/l for the commercial material.

The comb-like structure of the branched polyelectrolytes of this invention also forms a material having a plurality of multiple charged branch side chains. The high concentration of charges provides superior flocculation action for colloidal impurities in water purification. Higher molecular weight materials can be more readily achieved by branching than by linear polymerization. Four 25,000 molecular weight linked chains are the equivalent of a single linear 100,000 molecular weight polymer.

In the branch polymerization the first step is addition of a single AB group to the polymeric backbone as illustrated below with polyvinylbenzylchloride:

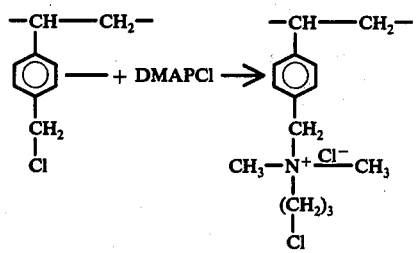

The Cl atom on the adduct is then available for chain propagation with a further molecule of DMAP Cl to form a polymeric chain of the comb-like structure.

When a tertiary nitrogen is pendant from the polymer backbone, such as in polyvinyl pyridine, the AB monomer adduct will have a structure of the formula:

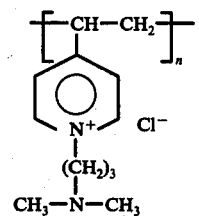

Similarly polydimethylaminoethylmethacrylate will form adducts of the formula:

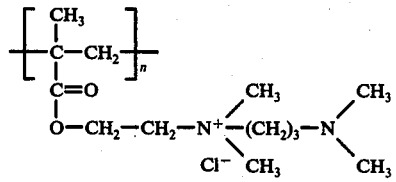

Further AB addition will extend the branch chain which will terminate in a dimethylamino group.

In the procedure in which the AB monomer adduct is formed initially, it is preferred that the equivalent ratio of AB monomer to polymer be 1:1 with respect to the A or B reactive functionality of the polymer. The adduct formation is preferably conducted at ambient temperature in a highly polar solvent such as DMF-methanol.

The adduct is precipitated in acetone and dried. Although neither the substrate polymer or the AB monomer are soluble in water, the adduct is water soluble. The dried adduct is then dissolved in water and additional monomer added. The soluble adduct polymer is found to act as a dispersing agent for the added AB monomer.

It is again preferred to conduct the linear AB polymerization in absence of oxygen which favors higher molecular weight products. Heating the reaction mixture to a temperature between 80° C – 110° C accelerates the reaction. The reaction is complete when a viscous solution or solid cake is formed. The mixture is freeze dried and water removed.

The two-stage reaction can also be conducted in bulk in the presence of excess AB monomer. The excess monomer will act as a solvent or diluent for the adduct. In the first step conducted at ambient, the adduct will form utilizing one unit of AB monomer per unit of reactive group on the polymer. The temperature is then raised and head-to-tail AB polymerization will proceed without the need to add more monomer.

Another technique is the attachment of preformed linear polymeric chains of AB monomer to the substrate polymer. This reaction can be conducted in highly polar solvent such as DMF-methanol and at room temperature.

The reaction must be carefully conducted in order to obtain a water soluble branched polymer. If the reaction mixture of substrate polymer in DMF-methanol contains excess AB monomer and is heated to a temperature above 80° C. an insoluble product is formed. However, a water soluble branched polymer is formed if this reaction is conducted in water or methanol.

The linear polymerization in the two-stage process must be carried out in the presence of water or methanol to assure a water soluble product except in the case of a bulk reaction.

EXAMPLE 12

31.g of polyvinylbenzylchloride were added to a 100 cc flask together with 26 grams of DMAP Cl. The reaction mixture was stirred at room temperature for 30 minutes, until the adduct formed as a precipitate which was then diluted with 60 ml of water. The solution formed was then heated in the presence of nitrogen for two hours at 100° C, during which the linear polymerization of the branch chains occurred due to the excess of the monomeric material present. The solution was then further diluted with 250 cc of water and freeze dried. The dried solid end product was soluble in water, methanol and 0.1 M sodium nitrate. The dry product, on heating at 60° C for two days, became partially insoluble in water. Heating at 100° C for the same period rendered the product completely insoluble in water.

The intrinsic viscosity of the formed product was found to be 0.38 in 0.4 M KBr. Gel permeation chromatography showed a single peak which indicated only a single species was present which was assumed to be the branched polyelectrolyte. Furthermore, when the same reaction was carried out with dimethylaminopropylchloride alone under identical conditions the intrinsic viscosity did not exceed 0.2.

When the reaction was carried out in absence of nitrogen gas only low intrinsic viscosity (0.1) products were obtained.

EXAMPLE 13

Six grams of poly 4-vinylpyridine was dissolved in 60 ml of DMF. 8 grams of dimethylamino-n-propylchloride were added to the solution. The mixture was then heated at 95° C for 18 hours under a nitrogen atmosphere.

The adduct was isolated as a low molecular weight polymer in an amount of 13.8 grams. The adduct was soluble in methanol, water and 0.1 M sodium nitrate and insoluble in acetone, DMF, and 0.4 M KBr. The intrinsic viscosity in 0.1 M $NaNO_3$ was 0.233.

EXAMPLE 14

Five grams of the product of Example 13 was dissolved in 16 ml of water. To this solution was then added 26 grams of dimethylamino-n-propylchloride. The mixture was heated to 100° C for four hours under a nitrogen atmosphere. A green solution was precipitated in acetone and the product dried in a vacuum oven at 30° C overnight. 30.2 grams of a product was obtained. The product was soluble in 0.4 M KBr, $H_2O$, MeOH and 0.1 M sodium nitrate. The intrinsic viscosity in 0.1 M sodium nitrate was 0.319.

EXAMPLE 15

An AB homopolymer was prepared having an intrinsic viscosity of 0.024 and was synthesized in accord with the method set forth in Example 2 above. 2.5 grams of the homopolymer of dimethylaminopropylchloride were dissolved in 30 ml methanol to which was then added 32 ml of DMF. A second separate solution was prepared containing 0.20 grams of polyvinylbenzylchloride having an average molecular weight of 40,000 dissolved in 2.2 ml of DMF. 2 ml of methanol were added to the second solution. The second solution of the backbone polymer was added to the homopolymer solution drop-wise with mixing. The mixture was allowed to react at room temperature for 24 hours. The solvent was then removed by vacuum evaporation. The resulting polymer weighed 2.7 grams and was not soluble in $H_2O$, methanol and DMF.

EXAMPLE 16

The branched polyelectrolyte formed in Example 14 above was utilized in a flocculation procedure as set forth in Example 5 above. An optimum dosage of 15 $\mu g/l$ of the polyelectrolyte was determined for the flocculation of a clay suspension.

EXAMPLE 17

An insoluble cross-linked hydrogel film was prepared from an aqueous solution containing 40 weight percent polyvinylalcohol, 40 weight percent acrylic acid, and 20 weight percent of the branch polyelectrolyte of Example 14. Crosslinking was achieved by heating a cast film of the material at 100° C for 10 minutes. The surface resistivity at 20 percent humidity for the film was $4.4 \times 10^5$ ohms per square.

EXAMPLE 18

A typical starch barrier coated raw paper stock was coated with a composition consisting of 50 parts of a clay conventionally utilized for making reproduction paper, 25 parts of polyvinylalcohol and 25 parts of the branch polyelectrolyte of Example 14 on a basis of 3 pounds of the composition per 3,000 square feet of paper surface. The surface resistivity of the coated paper at 10% relative humidity was found to be $10^9$ ohms/square.

EXAMPLE 19

0.22 gm of polyethylene imine (.005 mole) were mixed with 30.35 gm of DMAP Cl (0.25 mole). Ten ml of water were added and the mixture heated for two hours at 100° C. An additional 10 ml of water were added and the mixture heated to 100° C for another hour. A further 10 ml of water were added and heating continued for an additional 17 hours. The isolated branch polymer had an intrinsic viscosity of 0.15 dl/g.

High purity DMAP Cl monomer was prepared according to the following procedure.

EXAMPLE 20

DMAP Cl monomer was isolated from its hydrochloride salt by reaction with NaOH. 100 g (0.633 mole) of 3-dimethylamino-n-propyl chloride hydrochloride was dissolved in the minimum quantity of water, cooled in an ice bath and 200 ml of 20% NaOH solution added dropwise with vigorous stirring. The monomer was then extracted with several small portions of ether. The ether extracts were combined, washed twice with water and then dried over anhydrous magnesium sulfate. After a drying period of 12 hours, the ether solution was filtered and then rotary evaporated. The monomer, together with a small quantity of remaining ether, was finally vacuum distilled. The fraction distilling between 22° C and 25° C, at 5 mm Hg pressure, was collected and stored at 0° C until required. Both NMR and IR spectra confirmed the structure and purity of the monomer prepared as described above.

The monomer was allowed to polymerize at 41° C for five days in various solvent systems. The initial monomer concentration was kept constant at 1.0 molar. The results are summarized in Table III.

TABLE III
Effect of Solvent

| Solvent | Volume Ratio | % Yield | $(\eta)$ in 0.4M aq. KBr dl/g |
|---|---|---|---|
| DMF*/MeOH | (1:1) | 46 | 0.051 |
| DMF/MeOH | (1:2) | 36 | 0.047 |
| DMF/MeOH | (1:3) | 30 | 0.024 |
| DMF/H$_2$O | (4:1) | 100 | 0.092 |
| DMSO**/H$_2$O | (4:1) | 100 | 0.064 |
| DMSO/MeOH | (4:1) | 101 | 0.014 |
| CHCl$_3$ | | 90 | 0.050 |
| CH$_3$CN | | 81 | 0.053 |

*Dimethylformamide
**Dimethylsulfoxide

Table III shows that for the solvents tested the highest intrinsic viscosity was achieved in the DMF/H$_2$O system. The monomer was therefore allowed to polymerize at various temperatures using 4:1 DMF/H$_2$O as solvent and an initial monomer concentration of 1.0 mole/l. The reaction was allowed to continue until titration of unreacted end groups indicated that the polymerization was complete. The results are summarized in Table IV.

TABLE IV
Effect of Temperature

| Temperature ° C | % Yield | $(\eta)$ in 0.4M aq. KBr dl/g |
|---|---|---|
| 41 | 114 | 0.092 |
| 54 | 100 | 0.100 |
| 68 | 111 | 0.112 |
| 82 | 101 | 0.089 |
| 96 | 107 | 0.073 |

The yields over 100% are due to insufficient drying time. For this solvent system, the molecular weight decreases if the polymerization is carried out at a temperature above about 75° C.

The monomer was allowed to polymerize in either 4:1 DMF/H$_2$O or 4:1 DMSO/H$_2$O at 54° C, using various initial monomer concentrations and a 48 hour reaction time. The results are shown in Table V.

TABLE V
Effect of Initial Monomer Concentration

| Solvent | Initial Monomer Con. (mole/l) | % Yield | $(\eta)$ in 0.4M aq. KBr dl/g |
|---|---|---|---|
| DMF/H$_2$O | 0.5 | 98 | 0.033 |
| DMF/H$_2$O | 1.0 | 99 | 0.126 |
| DMF/H$_2$O | 1.5 | 100 | 0.142 |
| DMF/H$_2$O | 2.0 | 86 | 0.194 |
| DMF/H$_2$O | 2.5 | 91 | 0.175 |
| DMF/H$_2$O | 3.0 | 100 | 0.162 |
| DMF/H$_2$O | 3.5 | 100 | 0.164 |
| DMSO/H$_2$O | 1.0 | 100 | 0.064 |
| DMSO/H$_2$O | 1.5 | 100 | 0.102 |
| DMSO/H$_2$O | 2.0 | 100 | 0.129 |
| Bulk | — | 25 | 0.070 |

Tables III, IV and V indicate that for relatively high molecular weight the optimum solvent system is the DMF water mixture at temperatures in the range of 50° to 80° C and at a concentration of 2 to 3.5 moles/l. The insolubility of the final polymer in DMF water mixtures could be a reason for the difficulty in achieving intrinsic viscosities higher than 0.2 dl/g in 0.4M KBr solutions. The polymerization was therefore investigated in pure water in which the polymer is miscible in all proportions.

The 3,3-ionene chloride (AB polymer) was obtained by heating a stirred suspension of AB monomer in water. Table VI, below, illustrates the effects of air, oxygen and nitrogen on the yield and intrinsic viscosity of the polymer formed in the aqueous system.

TABLE VI
Polymerization of AB monomer in water in presence and absence of air

| Temp. ° C | Experim. Condition | Monomer Conc. m/l | Time of Reaction hrs. | Conversion % | $(\eta)$ in 0.4M KBr |
|---|---|---|---|---|---|
| 100° | Air | 5.96 | 4 | 62 | 0.146 |
| 100° | Oxygen | 5.96 | 4 | 66 | 0.098 |
| 100° | Nitrogen | 5.96 | 4 | 70 | 0.208 |
| 100° | Vacuum | 5.96 | 50 | 100 | 0.224 |
| 100° | Nitrogen | 5.96 | 50 | 100 | 0.223 |

The aqueous polymerization system (Table VI) thus offers a convenient technique for the synthesis of 3,3-ionene chloride with viscosities higher than those achieved in other solvents provided the process is carried out in absence of air and at high monomer concentration. Additional studies of monomer concentration and reaction time confirmed the above conclusion as illustrated in Table VII, which follows.

TABLE VII
Polymerization of AB monomer in water
Effect of reaction time and monomer concentratin at 100° C

| Monomer Concentration m/l | Reaction Time hrs. | Exp. Conditions | % Conversion | $(\eta)$ in 0.4M KBr dl/g |
|---|---|---|---|---|
| 5.96 | 4 | under N$_2$ | 70 | 0.208 |
| 5.96 | 50 | " | 100 | 0.223 |
| 4.87 | 8 | " | 90 | 0.199 |
| 4.46 | 8 | " | 90 | 0.189 |
| 4.12 | 8 | " | — | 0.140 |
| 6.69 | 50 | Vacuum | 100 | 0.199 |
| 5.96 | 50 | " | 100 | 0.223 |
| 5.96 | 50 | under N$_2$ | 100 | 0.223 |
| 5.96 | 148 | vacuum | 100 | 0.240 |
| 5.96 | 384 | vacuum | 100 | 0.230 |
| 5.54 | 50 | " | 100 | 0.210 |
| 4.87 | 50 | " | 100 | 0.174 |
| 4.46 | 50 | " | 100 | 0.162 |
| 4.12 | 50 | " | 100 | 0.145 |

The aqueous polymerization system can also be carried out at higher temperatures than the DMF/H$_2$O system. At higher temperatures in the presence of DMF, side reactions occur resulting in a lower intrinsic viscosity. Higher molecular weights are favored at higher concentration in water. The initial monomer concentration is at least 4 mole/l and preferably at least 6 mole/l. An even higher molecular weight was obtained by a multistage polymerization procedure in which the initial monomer concentration is at least 4 mole/l and polymerization proceeds for a first period to less than 100% but more than 50% conversion to polymer. The polymerization mixture is then diluted by diluting the monomer concentration as initially determined by at least 10% and polymerization continued to completion.

A very high molecular weight polymer was obtained by the following procedure.

EXAMPLE 21

DMAP Cl monomer (52 g) and water (16 ml) were combined to form a 7.22 molar mixture. The mixture was heated at 100° C in the presence of nitrogen for four hours. A solid material formed at the end of 4 hours. Another 16 ml of $H_2O$ was then added (dilution to 5.9 molarity on an initial basis) and the heating was continued for another 20 hours.

The 3,3-ionene chloride was then isolated. The intrinsic viscosity in 0.4M KBr was found to be equal to 0.25 dl/g which corresponds to a molecular weight of 63,000 as determined by the technique discussed below.

When this polymer is compared to the highest molecular weight polymer shown in Table VII, it is evident that reaction time has been decreased from 148 hours to 24 hours and the molecular weight of the product is higher at the shorter reaction time.

The molecular weights reported by the present inventors have been determined from the intrinsic viscosity molecular weight relationship in aqueous 0.4M KBr by means of light scattering and can be expressed approximately by:

$$[\eta] = (2.94 \times 10^{-4})M^{0.61}$$

Further details of the procedure are discussed by Casson and Rembaum, *Macromolecules* 5, 75 Jan.-Feb. 1972.

Reaction rates, for the homopolymerization of the DMAP Cl monomer, were measured by means of NMR spectra, determined at 60 or 220 megacycles or by titration of unreacted tertiary amine end groups. An aliquot of the reaction mixture was added to excess dilute hydrochloric acid and the unreacted acid titrated potentiometrically with dilute sodium hydroxide solution.

The rate of polymerization was followed by the previously described titration technique or by monitoring the NMR resonance peaks, either due to decreasing concentration of the

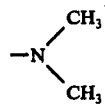

protons or increasing concentration of

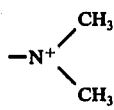

as a function of time. The validity of this procedure is substantiated by a careful analysis of high resolution 220 mc NMR spectra of the monomer and polymer; however, the actual rates were established using a 60 mc NMR spectrometer. The spectral changes occurring with time were determined. The rates of polymerization measured by means of the NMR technique agreed with those obtained by potentiometric titration of the chloride ion within ±10%. The kinetic results reflect the increase in rate at room temperature as the dielectric constant of the solvent increases. The same effect is shown at 55° C.

The molecular weight of the polymer increased with time of conversion as expected from a step growth polymerization system. The intrinsic viscosities determined in 0.4M aq. KBr as a function of polymerization time are shown in Table VIII.

TABLE VIII

Intrinsic viscosities of AB polymer isolated from separate batches of 1 molar AB monomer and polymerized at 54° C in $DMF/H_2O$ (4:1) as a function of time

| Time (hrs) | ($\eta$) in 0.4M aq. KBr dl/g |
|---|---|
| 16.0 | 0.062 |
| 21.5 | 0.097 |
| 47.2 | 0.122 |
| 71.5 | 0.117 |
| 383.5 | 0.101 |

The examination of Tables V and VIII indicates that relatively long reaction times lead to a decrease in intrinsic viscosity. In order to ascertain whether this decrease was due to occurrence of degradation, the polymers were kept at elevated temperatures in aqueous solutions and the relative viscosity of isolated samples was determined as a function of heating time. The data show that the polymer degrades slowly in water, much faster in presence of NaOH but is stabilized in presence of HCl.

The high crystallinity of different ionene bromides was established by the examination of X-ray diffraction patterns using $CuK\alpha$ radiation. Similar results were obtained with 3,3-ionene chloride. The X-ray diffraction patterns show that the high crystallinity persists in low and high molecular weight polymers and that the same is also true for 3,3-ionene perchlorate and 3,3-ionene triiodide.

A comparison of specific reduced viscosity of 3,3 and 6,6-ionene chloride as a function of ionic strength indicates that an ionene containing a large number of positive charges in its chain undergoes more extensive coiling with increasing ionic strength than the corresponding ionene with comparatively low numbers of positive charges. This is evidenced by comparing the $[\eta]_{sp/c}$ of 3,3-ionene chloride with that of 6,6-ionene chloride as a function of KBr concentration. The comparison also confirms the effect of decreased viscosity in KBr as compared with KCl solutions.

The intrinsic viscosities of polymer samples isolated from separate batches of 5.91 molar DMAP Cl monomer polymerized at 100° C in water are shown as a function of time in the following table:

TABLE IX

| Time, hrs. | Intrinsic Viscosity in 0.4M KBr, dl/g |
|---|---|
| 0.5 | 0.051 |
| 3.0 | 0.131 |
| 4.0 | 0.158 |
| 50.0 | 0.210 |

TABLE IX-continued

| Time, hrs. | Intrinsic Viscosity in 0.4M KBr, dl/g |
|---|---|
| 180.0 | 0.230 |

Again, the molecular weight increased with time of conversion as expected from a step growth polymerization system.

The effectiveness of the polyelectrolytes as dewatering agents for sludge was determined according to the Buchner funnel test. The test was conducted by adding an optimum amount of polyelectrolyte to a predetermined amount of sludge, placing the sludge on a sheet of 9 cm Whatman paper No. 4 within a Buchner funnel, applying a 24 inch vacuum to the funnel and measuring the volume of water collected over a time interval.

EXAMPLE 22

The optimum concentration of polyelectrolyte for dewatering waste activated sludge was first determined. The optimum amount of each polyelectrolyte was then added to a 500 ml sample of sludge containing 2% sludge solids, stirred at high velocity for 10 seconds, poured into the Buchner funnel and the vacuum activated. The results follow:

TABLE X

| Polyelectrolyte | Amount mg/l | Water, ml | Time, sec. |
|---|---|---|---|
| None | | 72 | 120 |
| Homopolymer (Ex. 1) | 115 | 100 | 99 |
| Tetraamine Star (Ex. 10A) | 500 | 100 | 90 |
| Polyethylene Imine Branch (Ex. 19) | 400 | 100 | 85 |
| Polyvinylbenzylchloride Branch (Ex. 12) | 200 | 100 | 52 |

EXAMPLE 23

200 ml samples of digested sludge containing 3.5% solids were subjected to the procedure of Example 22. The results follow:

TABLE XI

| Polyelectrolyte | Amount mg/l | Water, ml | Time, sec. |
|---|---|---|---|
| None | | 23 | 120 |
| Tetraamine Star (Ex. 10A) | 200 | 34 | 120 |
| Polyethylene Imine Branch (Ex. 19) | 200 | 49 | 120 |
| Polyvinylbenzylchloride Branch (Ex. 12) | 200 | 60 | 120 |

It is apparent that the effectiveness of the polyelectrolytes as dewatering agents increases as the charge density and amount of branching increases from homopolymer to star to branch, comb-polymer.

It is to be realized that only preferred embodiments of the invention have been described and that numerous substitutions, alterations and modifications may be made without departing from the spirit and scope of the invention as defined in the following claims.

What is claimed is:

1. A polyelectrolyte having an intrinsic viscosity molecular weight of at least 30,000 as determined by light scattering in 0.4M K Br consisting essentially of the adduct of linear polymeric segments of the formula:

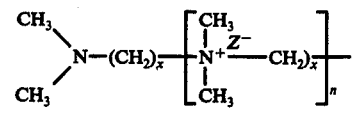

or

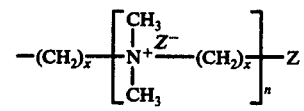

where Z is chloro, bromo or iodo, $n$ is an integer and $x$ is 3 or 7 to 10 linked directly by means of the quaternization reaction between the $(CH_3)_2$ N— or Z terminal groups of the segments to the tertiary amine or Z groups of a polyfunctional central monomer or polymeric substrate, said central monomer being selected from compounds of the formula:

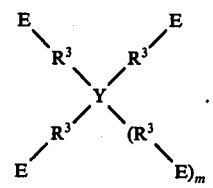

where Y is a polyvalent low molecular weight organic group having a valence of $3+m$, $m$ is an integer from 0–3, $R^3$ is selected from alkylene, phenylene or alkyl ester and E is Z or $(R^4)_3$ N— where $R^4$ is alkyl, aryl or aralkyl and said polymeric substrates are selected from the group consisting of polyvinylpyridine, polyethyleneimine, polyvinylbenzylchloride, poly-(dialkylaminoalkyl acrylate), poly-(dialkylamino alkyl acrylamide, polyepichlorohydrin and polydialkylaminoalkylethylene oxide.

2. A polyelectrolyte according to claim 1 in which $x$ is 3 and Z is chloro.

3. A polyelectrolyte according to claim 1 in which Y is aromatic.

4. A polyelectrolyte according to claim 3 in which $R_3$ is lower alkylene.

5. A polyelectrolyte according to claim 4 in which E is chloro, bromo or iodo.

6. A polyelectrolyte according to claim 5 in which Y is a benzene or alkylated benzene, $R^3$ is methylene, E is chloro and $m$ is 0 or 1.

7. A polyelectrolyte according to claim 6 in which the central monomer is selected from 2,3,6-tri-(chloromethyl)-mesitylene, 1,2,4,5-tetra-(chloromethyl)-benzene or 1,2,4-tri-(chloromethyl)-benzene.

8. A polyelectrolyte according to claim 1 in which the central monomer is selected from compounds of the formula:

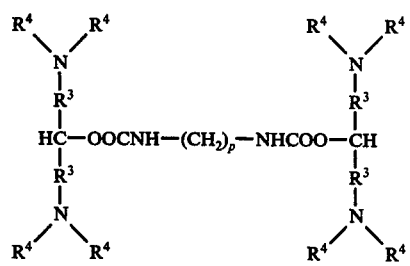

where $p$ is an integer from 2 to 10.

* * * * *